(No Model.)
W. D. SNOW.
TIRE.
No. 587,244.  Patented July 27, 1897.
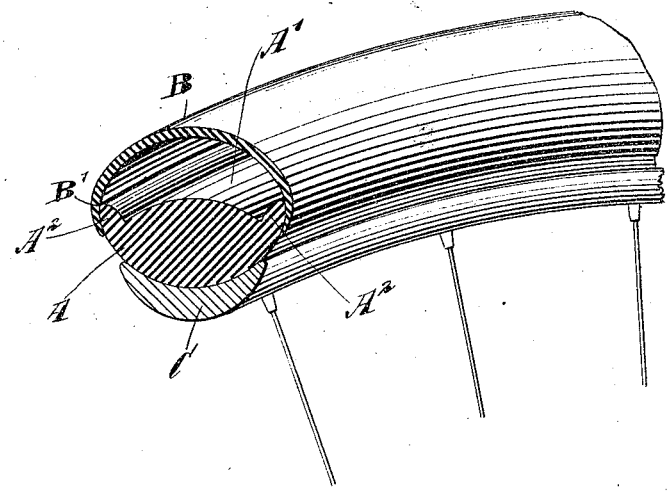
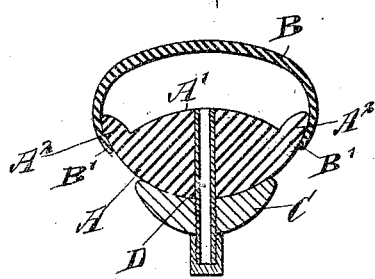 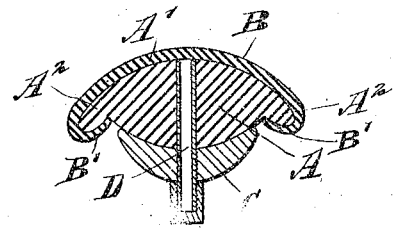
WITNESSES:
INVENTOR
W. D. Snow
BY
ATTORNEYS.

UNITED STATES PATENT OFFICE.

WILLIAM D. SNOW, OF NEW MILFORD, NEW JERSEY.

TIRE.

SPECIFICATION forming part of Letters Patent No. 587,244, dated July 27, 1897.

Application filed July 25, 1896. Serial No. 600,501. (No model.)

*To all whom it may concern:*

Be it known that I, WILLIAM D. SNOW, of New Milford, in the county of Bergen and State of New Jersey, have invented a new and Improved Tire, of which the following is a full, clear, and exact description.

The object of the invention is to provide a new and improved tire for bicycles and other vehicles, and arranged to change automatically and instantly from a pneumatic to a cushion tire in case the pneumatic shell is punctured.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a perspective view of the improvement as applied and arranged as a pneumatic tire. Fig. 2 is a cross-section of the same, and Fig. 3 is a like view of the same deflated to form a cushion-tire.

The tire is provided with a cushion-tire A and a shell B, secured at its sides to the sides of the cushion-tire A, the latter resting in the usual rim C of the bicycle or other vehicle wheel.

An air-filling tube D extends through the rim C and the cushion-tire A to permit of forcing air into the space between the periphery of the cushion-tire A and the inside of the shell B, so as to inflate the latter and thereby form a pneumatic tire, as plainly illustrated in Figs. 1 and 2.

The top or peripheral surface of the cushion-tire A is preferably rounded off, as at A', and the sides of the said cushion-tire are formed with annular lugs $A^2$, on which are fastened the sides B' of the shell B by cement or other suitable means, the said lugs normally extending downwardly and outwardly, as indicated in Fig. 3, with the shell B then resting snugly on the peripheral surface A' of the cushion-tire to form a rubber tire or skin for the said cushion-tire. When, however, air is forced into the tire, then the shell B is expanded, and in doing so the shell draws the lugs $A^2$ upwardly into the position shown in Figs. 1 and 2. Now in case of a puncture of the shell B the air instantly escapes and the tire becomes deflated, so that the shell B again passes back to its normal position, owing to its resiliency and the resiliency of the lugs $A^2$. Thus if a puncture of the pneumatic tire takes place an instant and automatic change is made to a cushion-tire, so that the rider can keep on using the wheel without much discomfort.

Having thus described my invention, I claim as new and desire to secure by Letters Patent—

1. A tire having a cushion portion provided at its sides with two inwardly-projecting resilient lugs or flanges, such lugs tending to extend inwardly from the sides to which they are attached, and a flexible pneumatic portion or tire the edges of which are respectively secured to the lugs or flanges of the cushion portion, the pneumatic portion or tire being capable of being inflated and of drawing the lugs or flanges from their normal position to extend outwardly from the cushion portion, such lugs or flanges being in turn capable of moving rearwardly with the pneumatic portion or tire when the said pneumatic portion or tire is deflated, substantially as described.

2. A vehicle-tire having a cushion portion provided at each side with a resilient lug or flange normally projecting inward from the cushion portion, and a flexible shell outward from the tread of the cushion portion and having its side edges respectively connected to the lugs or flanges, substantially as described.

WILLIAM D. SNOW.

Witnesses:
THEO. G. HOSTER,
JNO. M. RITTER.